United States Patent
Fripp et al.

(10) Patent No.: US 11,807,808 B1
(45) Date of Patent: Nov. 7, 2023

(54) ELECTRIC SCALE CONTROL WITH METAL ELECTRODES

(71) Applicant: Halliburton Energy Services, Inc., Houston, TX (US)

(72) Inventors: Michael Linley Fripp, Houston, TX (US); Ibrahim El Mallawany, Houston, TX (US); Rodrigo de Carvalho Mendez, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/664,254

(22) Filed: May 20, 2022

(51) Int. Cl.
*E21B 37/06* (2006.01)
*C09K 8/528* (2006.01)
*E21B 47/12* (2012.01)
*C23F 15/00* (2006.01)

(52) U.S. Cl.
CPC .............. *C09K 8/528* (2013.01); *C23F 15/00* (2013.01); *E21B 37/06* (2013.01); *E21B 47/12* (2013.01)

(58) Field of Classification Search
None
See application file for complete search history.

(56) References Cited

U.S. PATENT DOCUMENTS

| | | | |
|---|---|---|---|
| 5,057,228 A * | 10/1991 | Breen | C02F 5/14 252/180 |
| 6,042,713 A | 3/2000 | Keatch | |
| 6,880,402 B1 | 4/2005 | Couet et al. | |
| 2001/0052414 A1 | 12/2001 | Hammonds | |
| 2007/0289740 A1 * | 12/2007 | Thigpen | E21B 43/14 166/250.01 |
| 2008/0299006 A1 | 12/2008 | Ikemizu | |

(Continued)

FOREIGN PATENT DOCUMENTS

CN 105298402 A 2/2016

OTHER PUBLICATIONS

Malakinejad et al., "Cathodic Protection of Oil and Gas Well Casings," 1st National Iranian drilling Industry Congress (Conference), Jan. 2008.

(Continued)

*Primary Examiner* — Andrew Sue-Ako
(74) *Attorney, Agent, or Firm* — Kilpatrick Townsend & Stockton LLP

(57) ABSTRACT

Introducing metal ions into fluids produced from a wellbore may inhibit the formation of scale on downhole production equipment. The ions may be introduced by one or more electrodes disposed in downhole locations such as in a sand control screen assembly, an inflow control device or in a production tubing base pipe. Parameters indicative or predictive of scale formation may be monitored, and an electrical voltage supplied to the electrodes may be adjusted to in response to any predetermined threshold of the parameters being exceeded. In some embodiments, a chemical ion source may be provided, which may release ions in response to erosion or corrosion reaction controlled by electrical power. Electric control of scale production allows for targeted feedback control of the amount of metal ions released as a scale inhibitor without requiring storage of downhole chemical solutions or the passage of fluid lines to downhole locations.

19 Claims, 5 Drawing Sheets

(56) References Cited

U.S. PATENT DOCUMENTS

| | | | |
|---|---|---|---|
| 2010/0307753 A1* | 12/2010 | Rey | C09K 8/88 |
| | | | 166/305.1 |
| 2016/0290103 A1 | 10/2016 | Fontenelle et al. | |
| 2016/0333250 A1 | 11/2016 | Ghorbani et al. | |
| 2020/0048990 A1* | 2/2020 | Wang | C02F 5/14 |
| 2021/0269344 A1* | 9/2021 | Al-Harbi | E21B 37/06 |

OTHER PUBLICATIONS

Mubenga, "The Role of Zinc in Physical Water Treatment for Prevention of Scale," Thesis, University of Johannesburg, Dec. 1997.

Tijing et al., "Mitigation of Scaling in Heat Exchangers by Physical Water Treatment Using Zinc and Tournaline," Applied Thermal Engineering, vol. 31, Issues 11-12, Aug. 2011, pp. 2025-2031.

International Patent Application No. PCT/US2022/072460, International Search Report and the Written Opinion, dated Feb. 9, 2023, 12 pages.

* cited by examiner

ELECTRIC SCALE CONTROL WITH METAL ELECTRODES

BACKGROUND

The present disclosure relates generally to tools and methods for inhibiting scale formation in wellbore production equipment. More particularly, embodiments of the disclosure include scale prevention systems that may be controlled by electric power and do not require downhole chemical injection.

Wellbores are often drilled to access hydrocarbon fluids trapped in subterranean geologic formations. Under some downhole conditions, relatively insoluble substances in the produced fluids can be deposited as scale on downhole production equipment. Scale deposition is a common cause of obstructed flow passages and reduced wellbore production, especially in mature hydrocarbon wells. Chemical scale inhibitors can be injected to help avoid scale build up during the production phase, but this method requires additional fluid control lines and employs chemicals that are often environmentally sensitive and are difficult to supply in many deep-water applications.

BRIEF DESCRIPTION OF THE DRAWINGS

The disclosure is described in detail hereinafter, by way of example only, on the basis of examples represented in the accompanying figures, in which.

DETAILED DESCRIPTION

The present disclosure describes systems and methods for introducing metal ions into fluids produced from a wellbore to inhibit the formation of scale on downhole production equipment. The systems described herein may be controlled and adjusted exclusively by electric power and require no additional wellhead penetrations other than the electrical power. The ions may be introduced by one or more electrodes or other chemical ion sources disposed in downhole locations such as in a sand control screen assembly, an inflow control device, or a production tubing base pipe. Parameters indicative or predictive of scale formation may be monitored and ions may be released from the ion sources in response to determining that scale formation is likely at a downhole location proximate the ion sources. For example, an electrical voltage may be supplied to the electrodes or an electrical signal may be provided to an actuator operably coupled to the ion sources to release ions therefrom. In some embodiments, the release of ions may be initiated and/or adjusted to in response to any predetermined threshold of the parameters being exceeded. In some embodiments, a chemical ion source may be provided, which may release ions in response to erosion or corrosion reaction controlled by an electrically operable valve. Electric control of scale production not only eliminates the need for chemical injection lines to be run to lower completion equipment completion, but also eliminates the need for seafloor storage of chemicals and allows for targeted feedback control of the amount of metal ions released as a scale inhibitor. Although the scale control systems described herein may eliminate the need for chemical injection lines and seafloor storage, the scale control systems may be employed in combination with and supplement the scale control of traditional chemical injection systems. In some embodiments, a constant voltage or duty cycle may be applied to an electrode at a downhole location to release ions from the electrode at a constant rate, and in response to determining that scale formation is likely at the downhole location, an initiation or adjustment of a release of a traditional liquid chemical scale inhibitor may be implemented.

Figure 1:
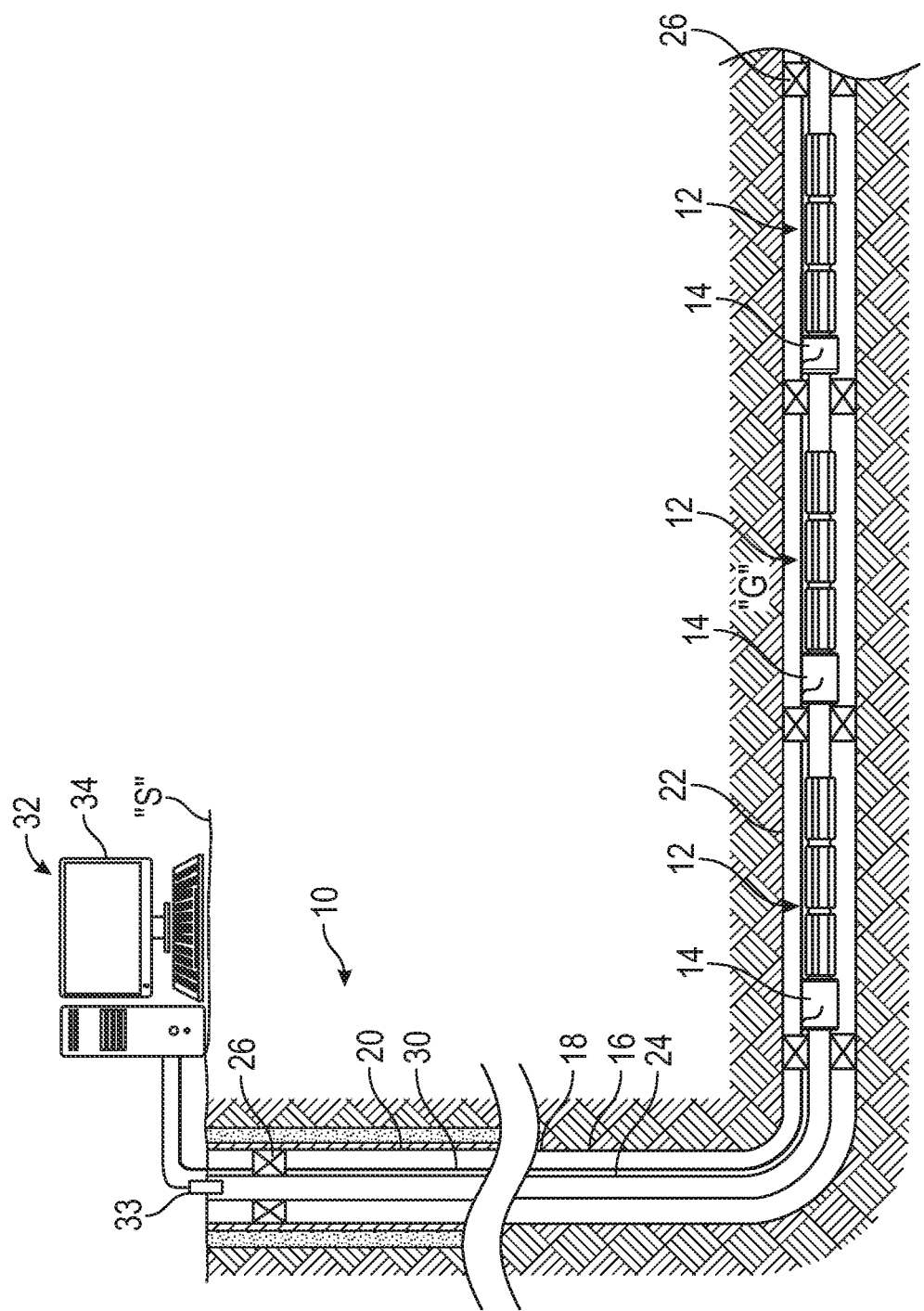
FIG. 1 is a partial, cross-sectional side view of a wellbore system including a plurality of sand control screen assemblies equipped with a scale control system in accordance with aspects of the present disclosure.

FIG. 1 illustrates a wellbore system 10 including a plurality of sand control screen assemblies 12, each equipped with a scale control system 14 in accordance with aspects of the present disclosure. Wellbore system 10 includes a wellbore 16 extending from a surface location "S" through a geologic formation "G." While wellbore 16 is illustrated extending from a terrestrial surface location "S," the principles described herein are equally applicable to subsea drilling operations that employ floating or sea-based platforms and rigs, without departing from the scope of the disclosure. Wellbore 16 has a substantially vertical section 18, the upper portion of which has installed therein a casing string 20 that is cemented within wellbore 16. Wellbore 16 also has a substantially horizontal section 22 that extends through a hydrocarbon bearing geologic formation "G." As illustrated, substantially horizontal section 22 of wellbore 16 is open hole.

Positioned within wellbore 16 and extending from the surface location "S" is a tubing string 24. Tubing string 24 provides a conduit for formation fluids produced from geologic formation "G" to travel to the surface location "S." The tubing string 24 may be supported in the wellbore 16 by packers 26 that engage the geologic formation "G." The sand control screen assemblies 12 are interconnected within the tubing string 24 and may receive fluids produced from the geologic formation "G." The sand control scree assemblies 12 are fluidly coupled in the tubing string 24 such that the produced fluids may be transmitted to the surface location "S." Each of the sand control screen assemblies 12 include a scale control system 14 associated therewith. Although FIG. 1 illustrates scale control system 14 associated only with sand screen control assemblies 12, the scale control systems 14 may be associated with other completion equipment such as fluid flow control devices, communication systems, safety valves and blank sections of tubing without departing from the scope of the disclosure.

Figure 2:
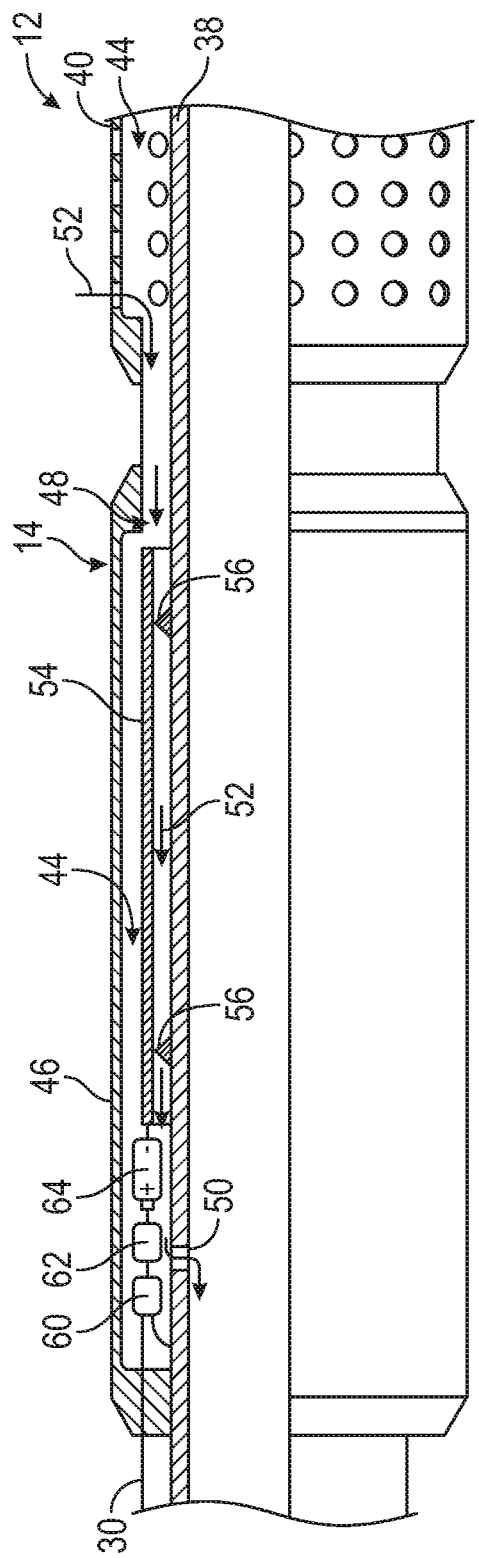
FIG. 2 is a partial, cross-sectional side view of one of the sand control screen assemblies of FIG. 1, illustrating a tubular electrode of the scale control system positioned around a base pipe of the sand control screen assembly and within a flow path extending into the base pipe.

Each of the scale control systems 14 is communicably coupled to the surface location "S." As illustrated in FIG. 1, each of the scale control systems 14 is communicably coupled to the surface location "S" by a control cable 30, but in other embodiments wireless telemetry may be employed without departing from the scope of the disclosure. The control cable 30 may comprise a tubing encapsulated conductor and is operable to transmit electrical power and/or instructions to the scale control system 14 sent by a controller 32. The controller 32 may include one or more processors for evaluating parameters measured by the scale control system 14 or any other component of the wellbore system 10. In some embodiments, the controller 32 may include instructions stored therein to transmit instructions to the scale control system 14 in response to a predetermined threshold being exceed. The predetermined threshold may include one or more parameters measured at an uphole scale sensor 33 and/or a downhole scale sensor 62 (FIG. 2). The threshold may include a rate of change of a single parameter such as pH, water cut, ion concentration, temperature, flow rate or a combination of parameters that indicate a likelihood of forming scale. The threshold may also include a predetermined time delay after a predetermined event. For example, it may be determined by a simulation or predictive model that the potential for scale formation at a downhole location exceeds a predetermined threshold after a time delay measured from the initiation of production from the wellbore.

The controller 32 may also include an operator interface 34, such as a monitor and keyboard, to permit an operator to evaluate the parameters and manually send instructions to the scale control systems 14. In other embodiments, a downhole controller (not shown) may be provided within the scale control systems 14 or with other completion equipment.

Although FIG. 1 illustrates the sand control screen assemblies 12 and scale control systems 14 of the present invention in the horizontal section 22 of the wellbore 16, the sand control screen assemblies 12 and scale control systems 14 of the present invention are equally well suited for use in deviated or vertical wellbores. Accordingly, it should be understood by those skilled in the art that the use of directional terms such as above, below, upper, lower, upward, downward and the like are used in relation to the illustrative embodiments as they are depicted in the figures, the upward direction being toward the top of the corresponding figure and the downward direction being toward the bottom of the corresponding figure. Likewise, even though FIG. 1 depicts the sand control screen assemblies 12 and scale control systems 14 of the present invention in a wellbore 16 having a single borehole, the sand control screen assemblies 12 and scale control systems 14 of the present invention are equally well suited for use in multilateral wellbores having a main wellbore and a plurality of branch wellbores. Although the scale control systems 14 are depicted in connection with sand control screen assemblies, the scale control systems 14 may be deployed in connection with inflow control valves (ICVs), frac sleeves, or other wellbore equipment without departing from the scope of the disclosure.

Referring now to FIG. 2, a sand control screen assembly 12 is illustrated with an associated scale control system 14. A base pipe 38 extends through the sand control screen assembly 12 and the associated scale control system 14 and interconnects with the tubing string 24 (FIG. 1). The sand control screen assembly 12 includes a perforated shroud 40 disposed around the base pipe 38, and an annular flow path 44 is defined between the perforated shroud 40 and the base pipe. In some embodiments, any number of other layers, for example, filter layers and drainage layers (not shown) may be coupled to the perforated shroud 40 to prevent the passage of particulates into the annular flow path 44.

The scale control system 14 includes a housing 46 circumscribing the base pipe 38 such that the annular flow path 44 continues through the scale control system 14. The housing 46 defines an inlet 48 through which produced fluids may enter the scale control system 14, and an outlet is defined by one or more radial openings 50 in the base pipe 38. Arrows 52 indicate fluid flow from an exterior of the perforated shroud 40, through the annular flow path 44 and into an interior of the base pipe 38 for production to the surface location "S" (FIG. 1). Within the housing 46 and the annular flow path 44, the scale control system 14 includes an electrode 54 constructed as a cylindrical sleeve circumscribing the base pipe 38. The electrode 54 is electrically isolated from the base pipe 38 by nonconductive supports 56.

The scale control system 14 also includes a downhole control unit 60, a downhole scale sensor 62 and a power source 64 operably coupled to the electrode 54. The downhole control unit 60 is communicably coupled to the controller 32 (FIG. 1) by control cable 30 and is operable to initiate, interrupt and adjust an electrical potential provided to the electrode 54 in response to receiving instructions from the controller 32 or in response to instructions stored locally therein. The scale sensor 62 is operable monitor at least one downhole parameter indicative or predictive of the potential for scale formation and to provide data regarding the downhole parameter to the downhole control unit 60. The scale sensor 62 may measure parameters such as temperature, flow rate, water cut, and/or specific fluid properties such as pH-value, chemical composition, and other fluid properties. By measuring parameters with a downhole scale sensor 62 at each of the scale control systems 14 in a wellbore 16 (FIG. 1), the potential for scale formation may be evaluated for individual zones in the wellbore 16. In some embodiments, only the individual zones where a predetermined threshold is exceeded may be treated with the scale control system 14 disposed therein. In other embodiments, each of the scale control systems 14 upstream of any individual zone in which a likelihood of scale formation is determined may be activated.

The downhole power source 64 may include a battery, or a downhole power generator such as a turbine that converts flow energy into flow energy. In embodiments including a downhole power source 64, the control cable 30 may be dedicated to transmitting communication signals or may be replaced with a wireless telemetry system such that the voltage applied to electrode 54 may be controlled from the surface "S" (FIG. 1). In embodiments where the downhole power source 64 is a turbine, a voltage output by the turbine may increase when a flow rate of the produced fluid 52 flowing through the annular flow path 44 increases. The increased voltage may be provided to the electrode 54 to increase the amount of ions released into the produced fluid 52. In this manner, the release of ions may be physically controlled by the flow rate. In other embodiments the flow rate may be measured by the downhole scale sensor 62 and evaluated by the downhole control unit 60. The downhole control unit 60 may then indirectly control the release of ions into the produced fluid 52 by controlling the voltage supplied to the electrode 54. In other embodiments (see, for example, FIGS. 5 and 6), electrical power may be transmitted to a scale control system 14 through the control cable 30. As illustrated, the downhole control unit 60 is electrically coupled the base pipe 38 such that the base pipe 38 may serve as an electrical ground. In other embodiments (see FIG. 5), the ground is represented by a second metallic electrode (like zinc as anode and copper as the cathode). In some embodiments, the anode electrode and cathode electrode are the same material. In some embodiments, the downhole power source 64 and/or the control cable 30 may provide a constant voltage to the electrode 54.

The electrode 54 is constructed of a metallic material such that, upon application of an electrical voltage thereto, metal ions are released into the produced fluid flowing through the annular flow path 44. The metal ions chemically react with dissolved salts in the produced fluid and may change the form of the precipitating salt so that scaling is less significant. In one example, the electrode 54 may be constructed of zinc such that zinc ions are released into the produced fluid. The zinc ions may react with calcium carbonate that is dissolved in the produced fluid, and the reaction may produce an aragonite form of calcium carbonate rather than permitting the calcium carbonate to be precipitated in its calcite form. The aragonite form of calcium carbonate may be readily produced to the surface location "S" (FIG. 1), while the calcite form is more likely to precipitate onto production equipment such as the base pipe where it may obstruct flow through radial openings 50 or other flow paths defined in production equipment downstream of the electrode 54.

The electrode 54 may be constructed of materials other than zinc. For example, the electrode 54 may be constructed from materials such as calcium, copper, iron, lead, manganese, cadmium, barium, strontium, cesium, aluminum, nickel, and magnesium. Magnesium ions, for example, when introduced into a produced fluid may be absorbed into a calcite crystal, thereby inhibiting further growth of the calcite crystal. Iron and nickel directly inhibit the initial formation of calcite. The ion concentration can vary from 0.1 ppm to 1000 ppm. Evidence suggests that 6 ppm of iron ions per liter of produced water will decrease calcite growth by 80% in a saturated solution. In some embodiments, silica may be combined with a metal material to form electrode 54. For example, colloidal silica may be employed to aid in the formation of a coagulated agglomerate of scale rather than a scale that adheres to the walls of the base pipe 38 and other production equipment.

Figure 3:
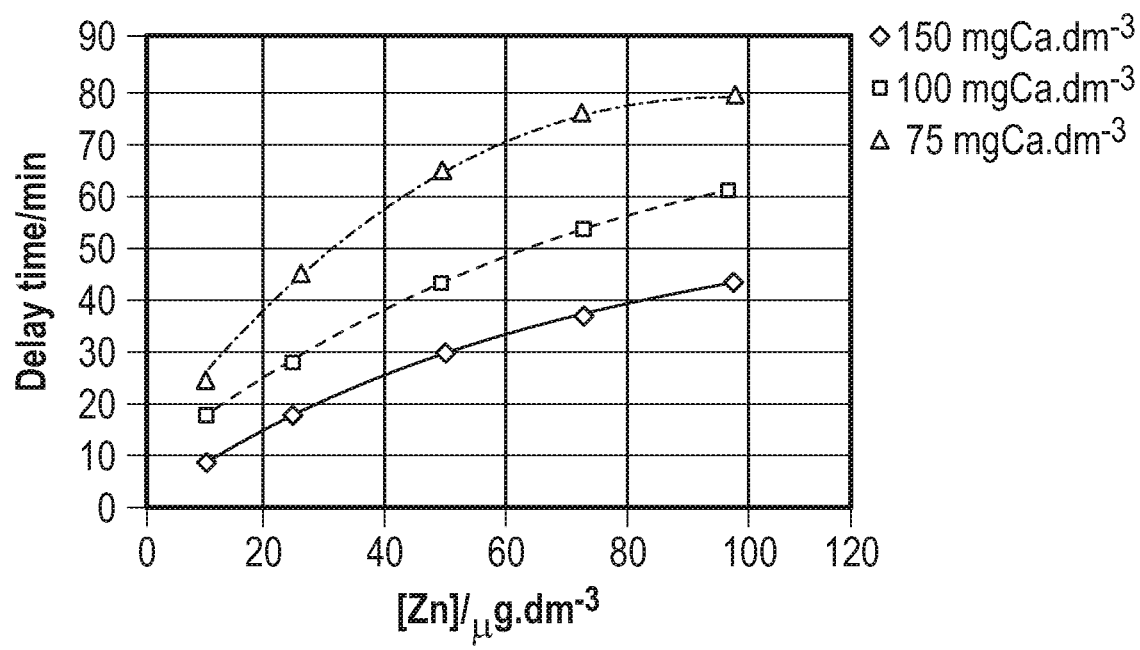
FIG. 3 is a graphical view of experimental data indicating that fluids with higher concentrations of ions, which may be discharged from the electrode of FIG. 2, may delay scale formation compared with fluids with lower concentrations of the ions.
Figure 4:
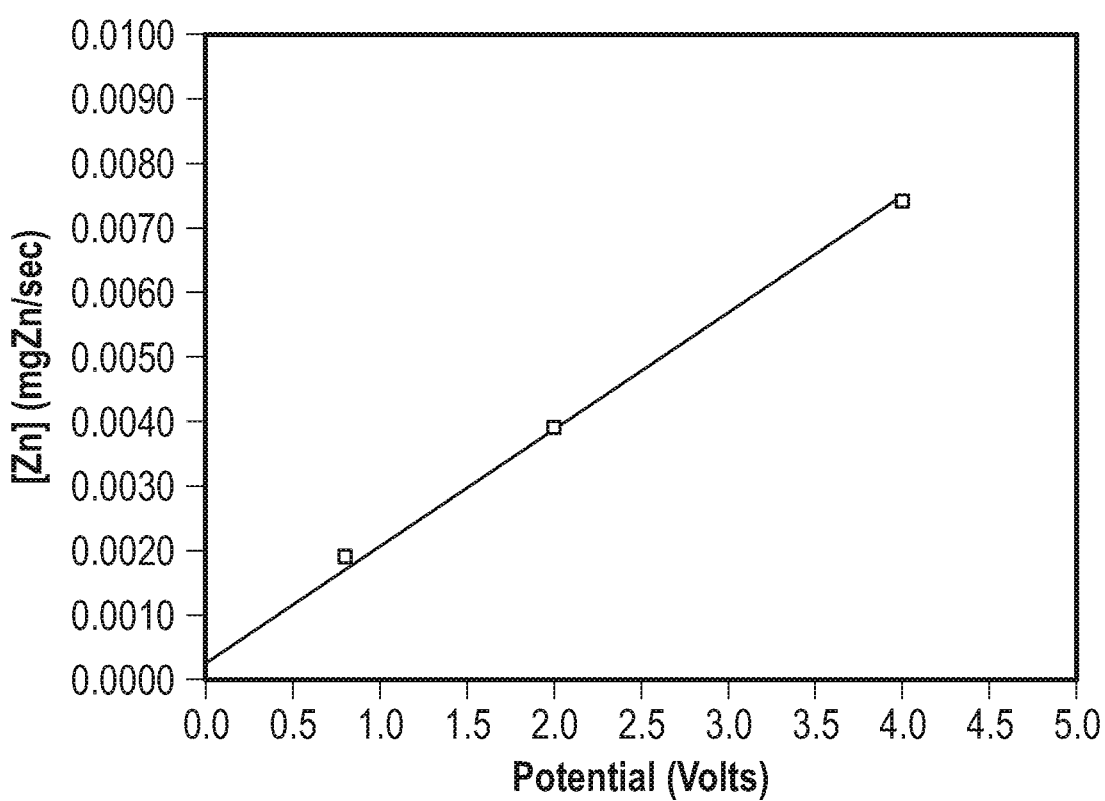
FIG. 4 is a graphical view of experimental data indicating a relationship between an amount of ions released from an electrode and an electrical voltage applied to the electrode.

As illustrated in FIGS. 3 and 4, and as indicated in "The Role of Zinc in Physical Water Treatment for Prevention of Scale" by Simon Bakakenga Mubenga (December 1997) the electrical voltage applied to the electrode 54 (FIG. 2) may be adjusted appropriately such that scale formation is effectively controlled. As illustrated in FIG. 3, experimental data indicates that fluids with higher concentrations of zinc ions may delay scale formation compared with fluids with lower concentrations of zinc ions. Three curves are illustrated, each representing a test fluid having different concentrations of dissolved calcium. A concentration of zinc ions in the test fluid is plotted along the x-axis and a delay in the detection of scale formation is plotted along the y-axis. Generally, with lower concentrations of calcium and with higher concentrations of zinc ions, greater delays in the formation of scale may be realized.

As indicated in FIG. 4, the electrolysis of zinc can be controlled electrically. A potential applied to a zinc electrode is plotted along the x-axis and a rate of introduction of zinc ions into a fluid surrounding the electrode is plotted on the y-axis. Over the tested range, the rate of ion introduction increases generally linearly with voltage. Since the electrolysis of zinc may be controlled electrically, and since greater concentrations of zinc ions may be associated with delays in scale formation, scale formation may be inhibited electrically. The amount of scale reduction may be substantial. Experiments have found with 200 micrograms of zinc ion per kilogram (0.2 ppm) of production fluid, scale formation may be reduced by 30% to 80%, and by over 50% in most of the tests performed.

Figure 5:
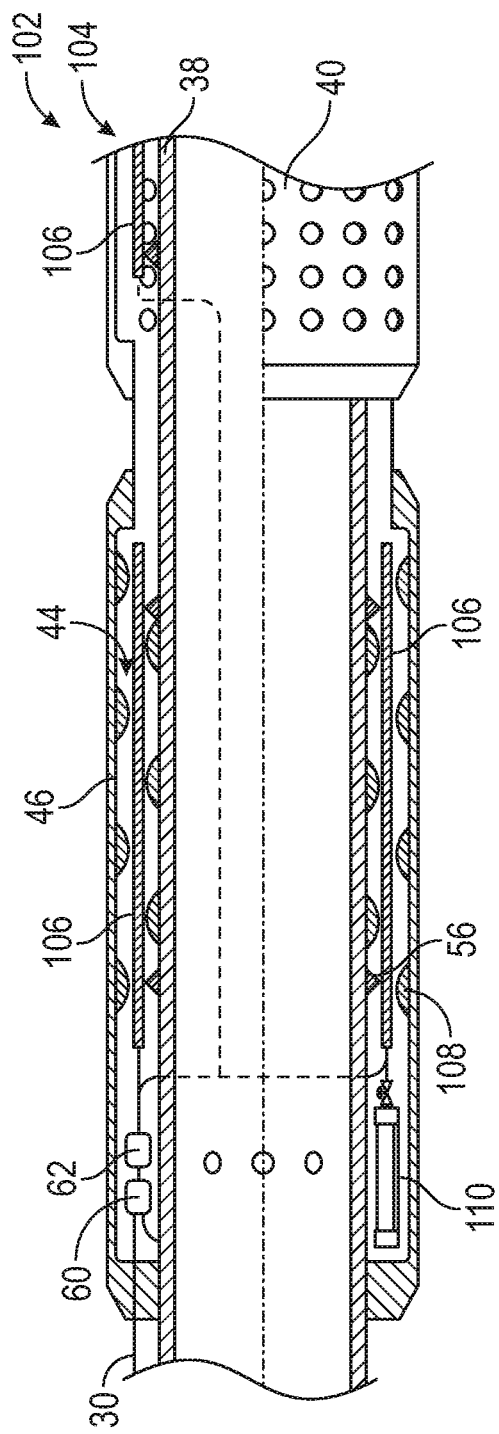
FIG. 5 is a partial, cross-sectional side view of another embodiment of a sand control screen assembly with a scale control system including a plurality of electrodes spaced circumferentially around the base pipe.

Referring to FIG. 5, another embodiment of a sand control screen assembly 102 with a scale control system 104 is illustrated including a plurality of electrodes 106 spaced circumferentially around the base pipe 38. Each electrode 106 may be generally rod-shaped and may be electrically isolated from the base pipe 38 by nonconductive supports 56. Electrodes 106 may be positioned within the housing 46 and/or within the perforated shroud 40 such that the electrodes 106 are exposed to produced fluids flowing through annular flow path 44. Each of the electrodes 106 is operably coupled to downhole control unit 60, scale sensor 62 and control cable 30 through which electrical power may be provided to the electrodes 106.

Electrical power, for example, an AC or DC voltage, may be provided to each of the electrodes 106 individually. In some example wellbore operations, electrical power may be provided to a single individual electrode 106 until the single individual electrode 106 is depleted of ions. Then the downhole control unit 60 may provide electrical power to a different one of the individual electrodes 106. In some other example wellbore operations, electrical power may be provided to two or more of the electrodes simultaneously. In some embodiments, each of the electrodes 106 may serve as an anode providing ions to the surrounding produced fluids while the base pipe 38 serves as the cathode. In other embodiments, one or more of the electrodes 106 may serve as an anode and one or more of the electrodes 106 may serve as a cathode.

As illustrated in FIG. 5, the annular flow path 44 may include flow guides 108, an ICD, an ICV, an AICD, a static mixer, a downhole power generator, and/or a flow direction changer to produce turbulent flow in the produced fluid. The hydrodynamic forces of the turbulent flow helps to disaggregate the suspended ions and allows the suspended ions to react with the salts that may otherwise form damaging scale.

Figure 6:
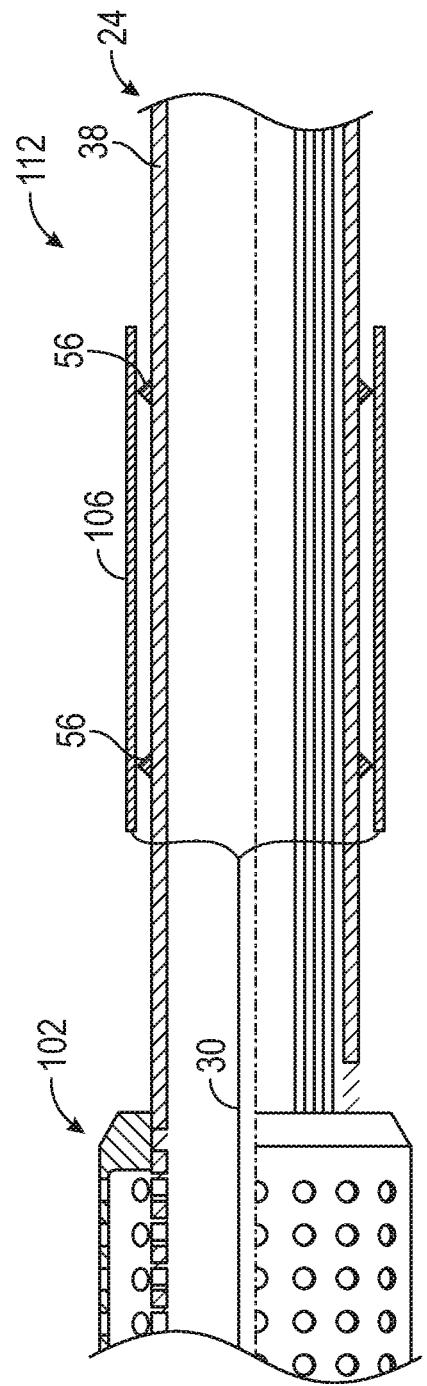
FIG. 6 is a partial, cross-sectional side view of another embodiment of a scale control system including a plurality of electrodes spaced upstream of a sand control screen assembly on a blank section of the tubing string.

As described above, a source 110 of a liquid scale inhibitor may be provided downhole as illustrated, or at a surface location. Liquid scale inhibitors suitable for use in accordance with the present invention include phosphonates, polyacrylic acid (PAA), phosphino carboxylic acid (PPCA), phosphate esters, or other traditional aqueous-based scale inhibitor chemistries. Suitable scale inhibitors will be known to those of skill in the art. The source 110 of the liquid scale inhibitor is operably coupled to the downhole control unit 60 and/or the surface controller 32 (FIG. 1) by control cable 30. Thus, the release of liquid scale inhibitors from the source 110 may be initiated or adjusted in response to a determination that scale formation is likely at particular downhole location. In this manner, the source 110 of liquid scale inhibitor may operate in conjunction with the operation of electrodes 106 and may supplement the release of ions from the electrodes 106. Referring to FIG. 6, another embodiment of a scale control system 112 is illustrated including a plurality of electrodes 106 spaced upstream of a sand control screen assembly 102 on an exterior of a blank section of the tubing string 24. Each electrode 106 is positioned on an exterior of base pipe 38 and electrically isolated from the base pipe 38 by nonconductive supports 56. The electrodes 106 are operably coupled to control cable 30 for controlled application of electrical power as described above. Sometimes the salts dissolved in produced fluids may form on the anode electrodes 106 in a form of scale passivation. The spaced placement of the electrodes 106 upstream of sand control screen assembly 102 permits this scale to form on the electrodes 106 without inhibiting flow of the production fluids into the sand control screen assembly 102. The electrodes 106 on an exterior of the base pipe 38 permit metal ions to be released into the production flow and will diffuse into the production flow and help to reduce the damaging formation of scale on downstream production equipment.

Figure 7:
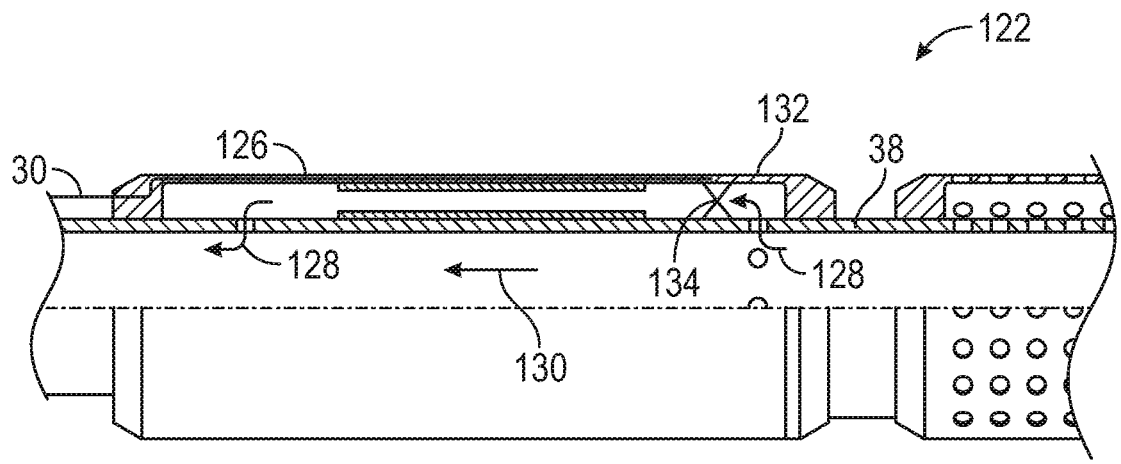
FIG. 7 is a partial, cross-sectional side view of another embodiment of a sand control screen assembly with a scale control system including a chemical ion source with and a valve to control an amount of fluid flowing across the chemical ion source.

Referring to FIG. 7, another embodiment of a scale control system 122 is illustrated including a chemical ion supply 126. The scale control system 122 may introduce ions into produced fluids by a dissolution process. Thus, the chemical ion supply 126 may include chemicals that may be difficult to introduce into a produced fluid by electrolysis. The chemical ion supply 126 is disposed in a divergent flow path 128 that is parallel to a main flow path 130 through the base pipe 38. As illustrated, the divergent flow path 128 is an annular flow path defined between the base pipe 38 and an exterior housing 132, and in other embodiments, a divergent flow path may be defined through the interior of the base pipe 38 without departing from the scope of the disclosure.

A valve 134 is provided within the divergent flow path 128 and may be electrically operable to control a proportion of the total fluid flow through the divergent flow path 128 and the main flow path 130. The fluid flow through the divergent flow path 128 erodes the chemical ion supply 126 releasing chemical ions into the fluid flow. Directing a greater proportion of the flow through the divergent flow path 128 more quickly erodes the chemical ion supply 128 and increases the rate of ions being released into the fluid flow. Directing a smaller proportion of the flow through the divergent flow path 128 more slowly erodes the chemical ion supply 128 and decreases the rate of ions being released into the fluid flow. The valve 134 may be operably coupled to the controller 32 (FIG. 1) by control cable 30 to receive instructions regarding the proportion of fluid flow to be directed through the divergent flow path 128.

Figure 8:
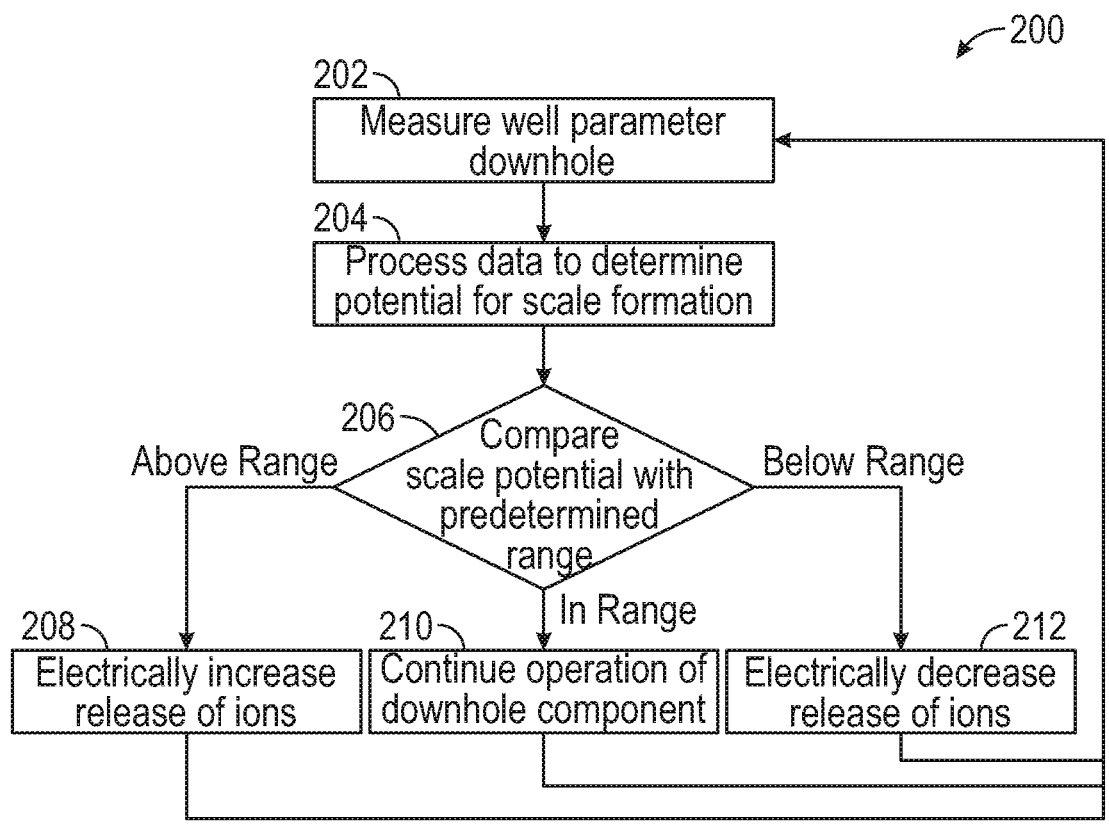
FIG. 8 is a flowchart illustrating a procedure inhibiting scale formation in a wellbore.

Referring now to FIG. 8, an example operational procedure 200 is illustrated for monitoring and inhibiting the formation of scale on downhole production equipment. Initially at step 202, one or more downhole wellbore parameters is initially measured and monitored, for example with scale sensors 33 (FIG. 1) and/or scale sensors 62 (FIGS. 2 and 5). Downhole wellbore parameters are not necessarily measured in real time. For example, downhole parameters may be measured in connection with a logging operation conducted in a wellbore in which a scale control system is to be deployed or in a neighboring wellbore. Parameters such as temperature, flow rate, water cut, and/or specific fluid properties such as pH-value, chemical composition, and other fluid properties may be measured and transmitted to controller 32. Parameters such as a time delay from any predetermined event may also be monitored. Next at step 204, the controller may process data received about the parameters to determine a potential for scale formation at one or more locations downhole. The potential for scale may represent any correlation determined between any combination of detected parameters and scale formation observed in previous wellbore operations.

At decision 206, a comparison is made between the scale potential determined in step 204 and a predetermined operating range desired for the scale potential. If the scale potential for a particular location is determined to be above the predetermined operating range, the procedure advances to step 208. An electrical control signal is sent through control cable 30 or by wireless telemetry to initiate the release of ions into the produced fluid or increase the number of ions released into the produced fluid upstream of the particular location. For example, a constant voltage may be supplied, a greater current or voltage may be imparted to the one or more electrodes 54, 106 (FIGS. 2 and 5) and/or a control signal may be transmitted to valve 134 (FIG. 7) to induce the valve 134 to open further and cause greater fluid flow through the divergent flow path 128. The resulting increased number of ions may further inhibit scale production. If the scale potential for a particular location is determined to be within the predetermined operating range, the procedure advances to step 210 where wherein the scale control systems 14, 104, 112, 122 continue to operate without adjustment. If the scale potential for a particular location is determined to be below the predetermined operating range, the procedure advances to step 212 where wherein the scale control systems 14, 104, 112, 122 may be electrically instructed to decrease the number of ions released into the produced fluid. For example, a lesser current or voltage may be imparted to the one or more electrodes 54, 106 (FIGS. 2 and 5) or a control signal may be transmitted to valve 134 (FIG. 7) to induce the valve 134 to close and cause less fluid flow through the divergent flow path 128. The resulting reduction in the release of ions may conserve the ions available for when they are needed.

The procedure 200 may then return to step 202 and the parameters may continue to be monitored. The parameters may be monitored by the controller 32 and adjustments may be made automatically in step 208 and 212 any time the controller 32 determines that the potential for scale production is outside the predetermined operating range. An operator may manually instruct the scale control systems 14, 104, 112, 122 to increase or decrease the release of ions using the controller 32.

The aspects of the disclosure described below are provided to describe a selection of concepts in a simplified form that are described in greater detail above. This section is not intended to identify key features or essential features of the claimed subject matter, nor is it intended to be used as an aid in determining the scope of the claimed subject matter.

According to one aspect, the disclosure is directed to a method of inhibiting scale formation in a wellbore. The method includes (a) measuring at least one wellbore parameter indicative or predictive of scale formation at a downhole location, (b) determining a potential for scale formation at the downhole location based on the wellbore parameter measured, (c) comparing the potential for scale formation to a predetermined operational range for the scale potential; (d) positioning an ion source in a flow path of a produced fluid proximate to the downhole location (e) releasing ions from the ion source in response to the scale potential being outside of the operational range and (f) reacting the ions with the produced fluid to reduce the likelihood of scale formation at the downhole location.

In some embodiments, the method further includes transmitting an electrical control signal from a surface location to a downhole control unit and wherein the release of ions is adjusted in response to the electrical control signal. In one or more embodiments, adjusting the release of ions comprises adjusting an amount of electrical energy delivered to at least one metal electrode disposed downhole. The method may further include depleting the at least one metal electrode of ions and subsequently delivering electrical energy to a different metal electrode.

In one or more embodiments, releasing ions includes adjusting a valve to control an amount of a produced fluid engaging the ion source and thereby eroding the ion source. Reacting the ions with the produced fluid may include chemically reacting the ions with dissolved calcium carbonate in the produced fluid to produce an aragonite form of calcium carbonate, and the aragonite may be produced to a surface location. The method may further include passing the produced fluid through a perforated shroud of a sand control screen, then reacting the produced fluid with the ions released from the ion source, and then passing the produced fluid into a base pipe of the sand control screen assembly. In some embodiments, the method may further include comprising adjusting the release of ions from the ion source in response to a manual operator command input into the controller.

According to another aspect, the disclosure is directed to a downhole scale control system. The system includes a scale sensor operable for measuring at least one wellbore parameter indicative or predictive of scale formation at a downhole location, a controller communicably coupled to the scale sensor, the controller operable to determine a potential for scale formation at the downhole location based on the wellbore parameter measured, to make a comparison of the potential for scale formation to a predetermined operational range for the scale potential and to generate an electrical control signal based on the comparison and a source of ions responsive to the electrical control signal to release ions into a produced fluid based on the electrical control signal.

In one or more embodiments, the source of ions includes at least one metal electrode operable to increase a release of metal ions in response to an increase of electrical power applied thereto. The at least one metal electrode may include at least one electrode constructed of zinc and/or the at least one metal electrode may be constructed of a metal material combined with silica. In some embodiments, the at least one metal electrode is constructed as a cylindrical sleeve disposed around a base pipe. The cylindrical sleeve may be supported on the base pipe by nonconductive supports electrically isolating the cylindrical sleeve from the base pipe. In some embodiments, the system may further include a valve selectively operable to direct a flow of produced fluid to the source of ions to induce erosion of the source of ions into the produced fluid.

According to another aspect, the disclosure is directed to a wellbore system. The wellbore system includes a tubular string extending into a wellbore, a scale sensor operable for measuring at least one downhole wellbore parameter indicative or predictive of scale formation at a downhole location in the tubular string, a controller communicably coupled to the scale sensor, the controller operable to determine a potential for scale formation at the downhole location based on the downhole wellbore parameter measured, to make a comparison of the potential for scale formation to a predetermined operational range for the scale potential and to generate an electrical control signal based on the comparison and a source of ions responsive to the electrical control signal to release ions into a produced fluid flowing through the tubular string based on the electrical control signal.

In some embodiments, the wellbore system further includes a sand control screen assembly fluidly coupled within the tubular string. In some embodiments, the source of ions is disposed between a perforated outer shroud of the sand control screen assembly and a base pipe of the sand control screen assembly. In one or more embodiments, the source of ions includes a metal electrode formed as a cylindrical sleeve disposed around the base pipe, wherein the cylindrical sleeve and the base pipe are operably coupled to a source of electrical power. In some embodiments, the source of ions may include at least one metal electrode disposed on an exterior of the tubular string at an upstream location with respect to the sand control screen assembly. In some embodiments, the tubular string defines a main flow path therethrough, and the source of ions is disposed in a divergent flow path that is parallel to a main flow path and wherein the wellbore system further includes a valve operable to control proportions of fluid flow flowing in the main flow path and the divergent flow path.

The Abstract of the disclosure is solely for providing the United States Patent and Trademark Office and the public at large with a way by which to determine quickly from a cursory reading the nature and gist of technical disclosure, and it represents solely one or more examples.

While various examples have been illustrated in detail, the disclosure is not limited to the examples shown. Modifications and adaptations of the above examples may occur to those skilled in the art. Such modifications and adaptations are in the scope of the disclosure.

What is claimed is:

1. A downhole scale control system, comprising:
   a scale sensor operable for measuring at least one wellbore parameter indicative or predictive of scale formation at a downhole location;
   a controller communicably coupled to the scale sensor, the controller operable to determine a potential for scale formation at the downhole location based on the wellbore parameter measured, to make a comparison of the potential for scale formation to a predetermined operational range for the potential for scale formation and to generate an electrical control signal based on the comparison; and
   a source of ions responsive to the electrical control signal to release ions into a produced fluid based on the electrical control signal, wherein the ions comprise metal ions positionable for use as scale inhibitors, and wherein the source of ions comprises at least one metal electrode operable to increase a release of metal ions in response to an increase of electrical power applied thereto.

2. The system according to claim 1, wherein the at least one metal electrode includes at least one electrode constructed of zinc, calcium, copper iron, lead, manganese, cadmium, barium, strontium, cesium, aluminum, nickel, or magnesium.

3. The system according to claim 1, wherein the at least one metal electrode includes at least one electrode constructed of zinc.

4. The system according to claim 1, wherein the at least one metal electrode is constructed of a metal material combined with silica.

5. The system according to claim 1, wherein the at least one metal electrode is constructed as a cylindrical sleeve disposed around a base pipe, and wherein the cylindrical sleeve is supported on the base pipe by nonconductive supports electrically isolating the cylindrical sleeve from the base pipe.

6. The system according to claim 1, further comprising a valve selectively operable to direct a flow of produced fluid to the source of ions to induce erosion of the source of ions into the produced fluid.

7. A wellbore system, comprising:
a tubular string extending into a wellbore;
a scale sensor operable for measuring at least one downhole wellbore parameter indicative or predictive of scale formation at a downhole location in the tubular string;
a controller communicably coupled to the scale sensor, the controller operable to determine a potential for scale formation at the downhole location based on the downhole wellbore parameter measured, to make a comparison of the potential for scale formation to a predetermined operational range for the potential for scale formation and to generate an electrical control signal based on the comparison; and
a source of ions responsive to the electrical control signal to release ions into a produced fluid flowing through the tubular string based on the electrical control signal, wherein the ions comprise metal ions positionable for use as scale inhibitors, and wherein the source of ions comprises at least one metal electrode operable to increase a release of metal ions in response to an increase of electrical power applied thereto.

8. The wellbore system according to claim 7, further comprising a sand control screen assembly fluidly coupled within the tubular string.

9. The wellbore system according to claim 8, wherein the source of ions is disposed between a perforated outer shroud of the sand control screen assembly and a base pipe of the sand control screen assembly.

10. The wellbore system according to claim 9, wherein the source of ions comprises the at least one metal electrode formed as a cylindrical sleeve disposed around the base pipe, wherein the cylindrical sleeve and the base pipe are operably coupled to a source of electrical power.

11. The wellbore system according to claim 8, wherein the at least one metal electrode is disposed on an exterior of the tubular string at an upstream location with respect to the sand control screen assembly.

12. The wellbore system according to claim 7, wherein the tubular string defines a main flow path therethrough, wherein the source of ions is disposed in a divergent flow path that is parallel to a main flow path and wherein the wellbore system further includes a valve operable to control proportions of the produced fluid flowing in the main flow path and the divergent flow path.

13. A method of inhibiting scale formation in a wellbore, the method comprising:
measuring at least one wellbore parameter indicative or predictive of scale formation at a downhole location;
determining a potential for scale formation at the downhole location based on the wellbore parameter measured;
comparing the potential for scale formation to a predetermined operational range for the potential for scale formation;
positioning an ion source in a flow path of a produced fluid proximate to the downhole location;
releasing ions from the ion source in response to the potential for scale formation being outside of the operational range;
transmitting an electrical control signal from a surface location to a downhole control unit and wherein the release of ions is adjusted in response to the electrical control signal; and
reacting the ions with the produced fluid to reduce a likelihood of scale formation at the downhole location, wherein the ions comprise metal ions positionable for use as scale inhibitors, and wherein the ion source comprises at least one metal electrode operable to increase a release of metal ions in response to an increase of electrical power applied thereto.

14. The method according to claim 13, wherein adjusting the release of ions comprises adjusting an amount of electrical energy delivered to at least one metal electrode disposed downhole.

15. The method according to claim 13, further comprising depleting the at least one metal electrode of ions and subsequently delivering electrical energy to a different metal electrode.

16. The method according to claim 13, wherein releasing ions comprises adjusting a valve to control an amount of a produced fluid engaging the ion source and thereby eroding the ion source.

17. The method according to claim 13, wherein reacting the ions with the produced fluid includes chemically reacting the ions with dissolved calcium carbonate in the produced fluid to produce an aragonite form of calcium carbonate and producing the aragonite to a surface location.

18. The method according to claim 13, further comprising passing the produced fluid through a perforated shroud of a sand control screen, then reacting the produced fluid with the ions released from the ion source, and then passing the produced fluid into a base pipe of a sand control screen assembly.

19. The method according to claim 13, further comprising adjusting the release of ions from the ion source in response to a manual operator command input into the controller.

* * * * *